United States Patent [19]
Tremblay

[11] Patent Number: 5,826,470
[45] Date of Patent: Oct. 27, 1998

[54] CAM OPERATED QUICK RETURN FEED CONTROL FOR LATHE MACHINE TOOL

[75] Inventor: Clement Tremblay, Citrus Heights, Calif.

[73] Assignee: TRI Tool Inc., Rancho Cordova, Calif.

[21] Appl. No.: 677,225

[22] Filed: Jul. 9, 1996

[51] Int. Cl.⁶ .................................................. B23B 3/26
[52] U.S. Cl. ................................ 82/113; 82/70.2; 82/130
[58] Field of Search .............................. 82/113, 53.1, 59, 82/61, 65, 70.2, 72, 83, 100, 130

[56] References Cited

U.S. PATENT DOCUMENTS

| | | | |
|---|---|---|---|
| 3,807,047 | 4/1974 | Sherer et al. ...................... | 82/113 X |
| 4,791,842 | 12/1988 | Olson .................................... | 82/113 |
| 4,813,314 | 3/1989 | Kwech .................................. | 82/113 |
| 4,944,205 | 7/1990 | Ricci ..................................... | 82/113 |
| 5,549,024 | 8/1996 | Ricci ..................................... | 82/113 |

Primary Examiner—A. L. Pitts
Assistant Examiner—Henry W. H. Tsai
Attorney, Agent, or Firm—Bacon & Thomas

[57] ABSTRACT

A feed control for a tool bit carried by a headstock of a lathe includes a driving cam having a profiled lobe that permits automatic quick return of the tool bit following each cutting operation. The cam is driven in a forward feed direction by a cam actuator arm carried by the headstock of the lathe that is connected to the cam through a one-way drive clutch that converts oscillating motion of the cam actuator arm into unidirectional intermittent rotational motion of the cam. A control device is provided to adjust the incremental feed rate of the tool bit by controlling the motion of the cam actuator arm and the staring position of the tool bit between cutting cycles is adjustable.

11 Claims, 5 Drawing Sheets

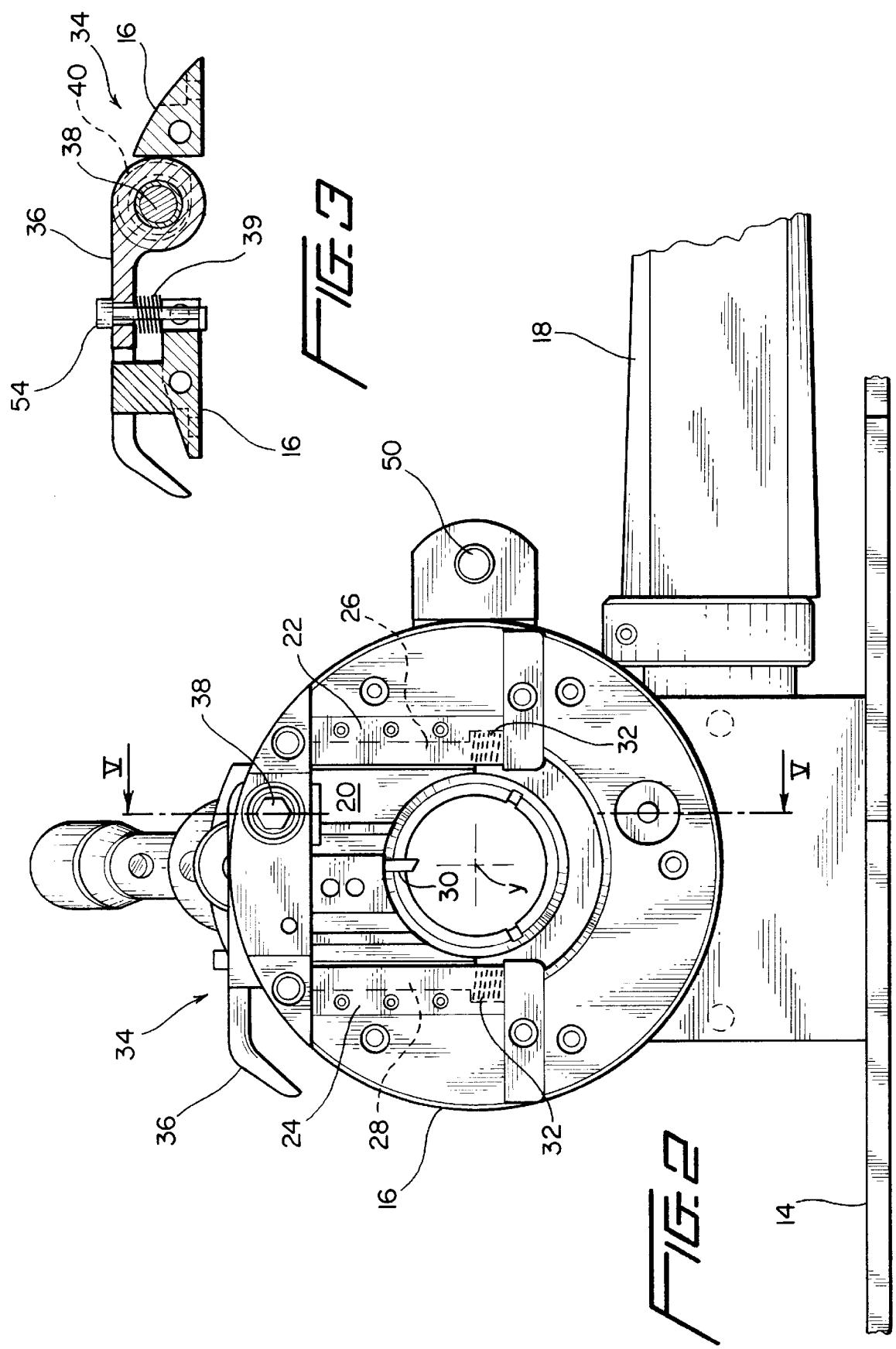

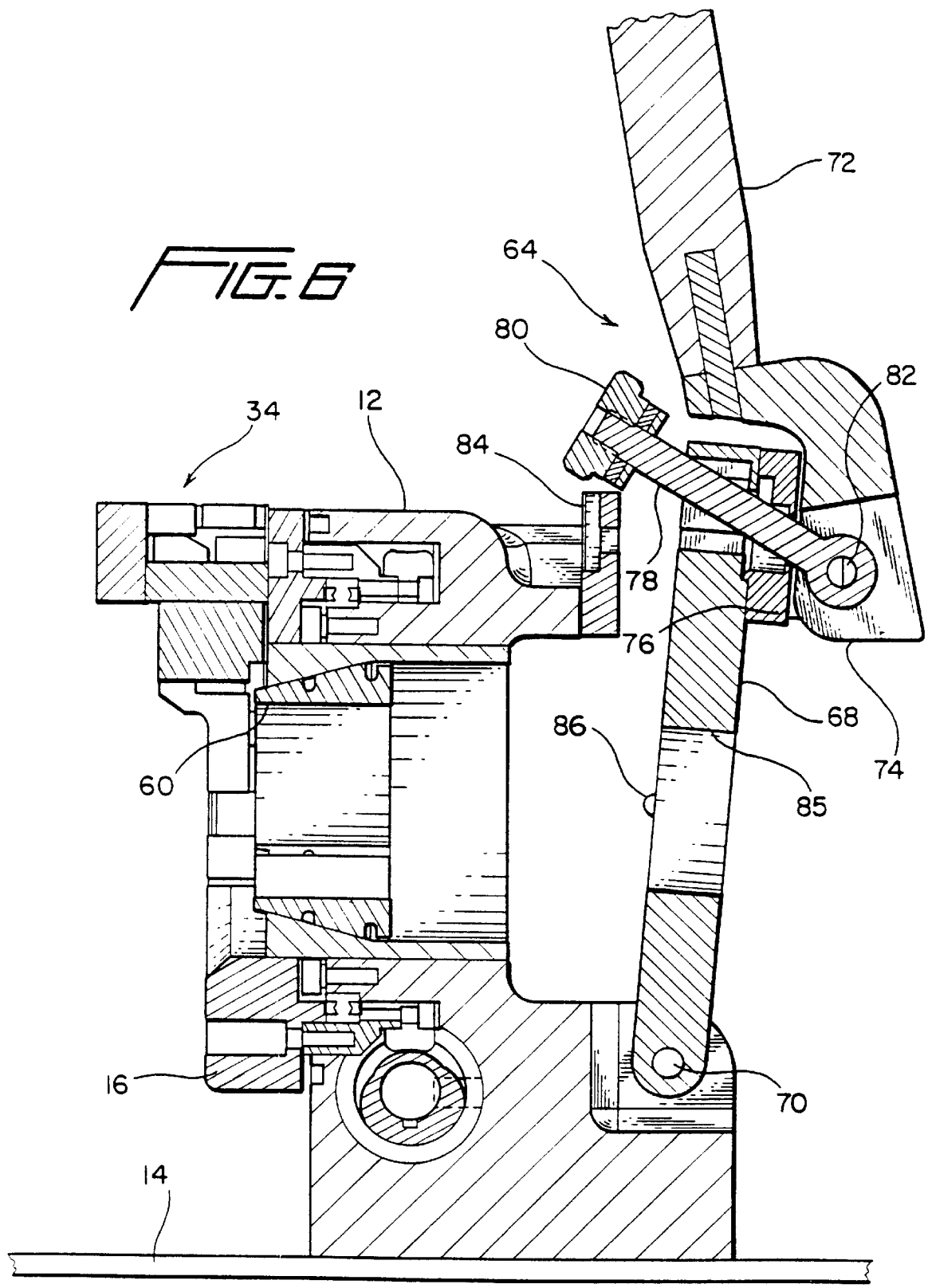

CAM OPERATED QUICK RETURN FEED CONTROL FOR LATHE MACHINE TOOL

BACKGROUND OF THE INVENTION

1. Field of Invention

This invention is a cam-actuated quick return feed control for a machine tool such as a lathe.

2. Related Technology

Feed controls for incrementally advancing cutter tool bits into cylindrical metal workpieces while the tool bit traverses an internal or external peripheral surface of the workpiece take various forms in the prior art. Most typically, a feed screw is utilized to feed the tool bit into the work with the screw itself being incrementally rotated by a striker on the tool housing engaging a star wheel or the like associated with the feed screw each revolution of the rotary tool carrying head or headstock of the machine tool. Feed rate adjustment is accomplished typically by controlling the degree of rotation of the screw each time the star wheel passes the striker, although other arrangements are known as well.

Depending upon the tool layout, the rotary motion of the feed screw is usually transmitted directly to the tool bit carrier by a threaded follower feed nut connected to the tool carrier and that is displaced axially along the feed screw when the latter is incrementally rotated a prescribed "advance" or "feed" amount, each rotation of the headstock of the machine tool.

After a cut is made as a result of the tool bit advancement into the workpiece while it is driven relative to the workpiece, the tool bit and its carrier must be quickly returned to a starting position in preparation for the next cutting operation. Since the feed nut is coupled to the feed screw at the full advance position, retraction of the tool bit to its starting position can be somewhat time-consuming if manual or even motor driven reverse rotation of the feed screw is required to return the tool bit to starting position. For high production lathes, this time delay is undesirable.

Feed screws and their associated feed nuts are precisely machined components that are expensive and time-consuming to manufacture. The rigors of their operational environment subject them to metal chips, dirt and impact from tools and workpieces unless they are properly protected, and the normal wear and tear on these components requires them to be periodically replaced to maintain accuracy of the tool bit feed control system.

It is also highly desirable that the tool bit of a lathe used to part or cut off a tubular workpiece be positionable rapidly at a starting position that is closely adjacent the starting point for the cutting operation to reduce the time required for the tool bit to reach the surface of the workpiece. In addition, it is highly desirable in a feed control system that the increment of feed each cycle of rotation of the headstock of the machine tool be adjustable to provide flexibility in terms of workpiece materials, tool bit life and cutting speeds.

BRIEF SUMMARY OF THE INVENTION

This invention was created to solve problems associated with screw-type feed control systems used in the prior art, and specifically to provide a feed control system for a tool bit carried by the rotary headstock of a lathe-type machine tool that provides precise increments of feed for the tool bit while providing quick return and starting location features that return the tool bit to a precise starting position following a cutting operation. The tool bit feed control system also permits adjustment of the rate of feed of the tool bit and provides an adjustable stop device for accurately locating the starting position of the tool bit between cutting operations. The tool feed control system of the invention uses a rotary cam driven tool bit carrier in which intermittent unidirectional rotation of a cam is converted to uniform linear feed motion of a tool bit carrier. This system is unique in that it uses a one-way drive clutch associated with the cam to smoothly convert intermittent oscillating pivotal movement of a cam actuator arm or lever into unidirectional intermittent rotary motion that is imparted to the cam.

The cam actuator arm of the invention is driven in oscillating motion by engaging a relatively fixed striker on the tool housing that pivots the arm at least once per tool revolution in one direction and a return spring that drives the arm back in the reverse direction to a starting position. The one-way clutch connects the actuator arm to the cam for driving motion in one direction only while another clutch or the like prevents reverse rotation of the cam relative to the tool headstock. The entire assembly of tool bit carrier, cam, actuator arm and drive clutch is carried by the rotating tool headstock.

Tool bit feed rate adjustments are carried out by controlling the throw of the actuator arm. The starting position of the tool bit carrier is adjustable by an adjustable return stop arrangement.

The cam of the feed control includes a profile that enables quick return of the tool carrier after the carrier has been advanced to its maximum depth of cut position. A spring return system is used to bias the tool carrier against the cam and towards its starting position.

Accordingly, the invention is a control for a machine tool including a relatively fixed housing, a rotary head carrying a radially movable cutting tool bit holder attached to the housing and rotatable about a longitudinal axis of rotation to drive the tool bit in rotation about the axis in a cutting plane with the tool bit holder movable in feed directions radial towards and away from the axis. The housing includes a workpiece holder for holding a workpiece fixed relative to the longitudinal rotational axis of the rotary head of the tool. The feed control comprises a cyclically driven, cam actuator arm pivotally mounted on the rotary head for oscillating pivotal movement; a rotational cam element having a profiled lobe carried by the rotary head periodically driven in a single forward rotary direction relative to the rotary head upon cyclic pivotal movement of the cam actuator arm. The cam element lobe is arranged to cooperate with the tool bit holder such that periodic rotation of the cam in a single direction causes periodic motion of the tool bit holder in a tool feed direction towards the axis of rotation up to the maximum lift of the cam lobe.

A resilient biasing device is arranged to urge the tool bit holder towards the cam. The cam actuator arm drives the cam element through a one-way clutch device such that pivotal motion of the cam actuator arm in one direction is transmitted to the cam as periodic unidirectional rotation through the one-way drive clutch.

The invention also includes a reverse rotation preventing device connected between the rotary head of the machine tool and the cam to prevent reverse rotation of the cam relative to the rotary head.

Another aspect of the invention involves mounting the actuator arm on the rotary head for pivotal motion about a pivot axis extending parallel to the axis of rotation of the rotary head of the machine tool, and a striker element carried by the housing cooperating with the actuator arm. A return device associated with a cam actuator arm is provided for returning the arm to a starting position each cycle of rotation of the rotary head.

A motion limiting device is associated with the cam actuator arm to limit the forward feed range of pivotal motion of the actuator arm upon its engagement with the striker element.

The tool bit carrier starting position is controlled by an adjustable return stop device arranged to limit the return position of the tool bit holder.

BRIEF DESCRIPTION OF THE DRAWINGS

FIG. 2 is an elevation end view of the tool shown in FIG. 1;

FIG. 3 is a section view taken along line III—III of FIG. 1;

FIG. 6 is a section side view similar to FIG. 5 showing the workpiece holding chuck and its actuator in open position.

DETAILED DESCRIPTION OF THE PREFERRED EMBODIMENT(S) OF THE INVENTION

Figure 1:
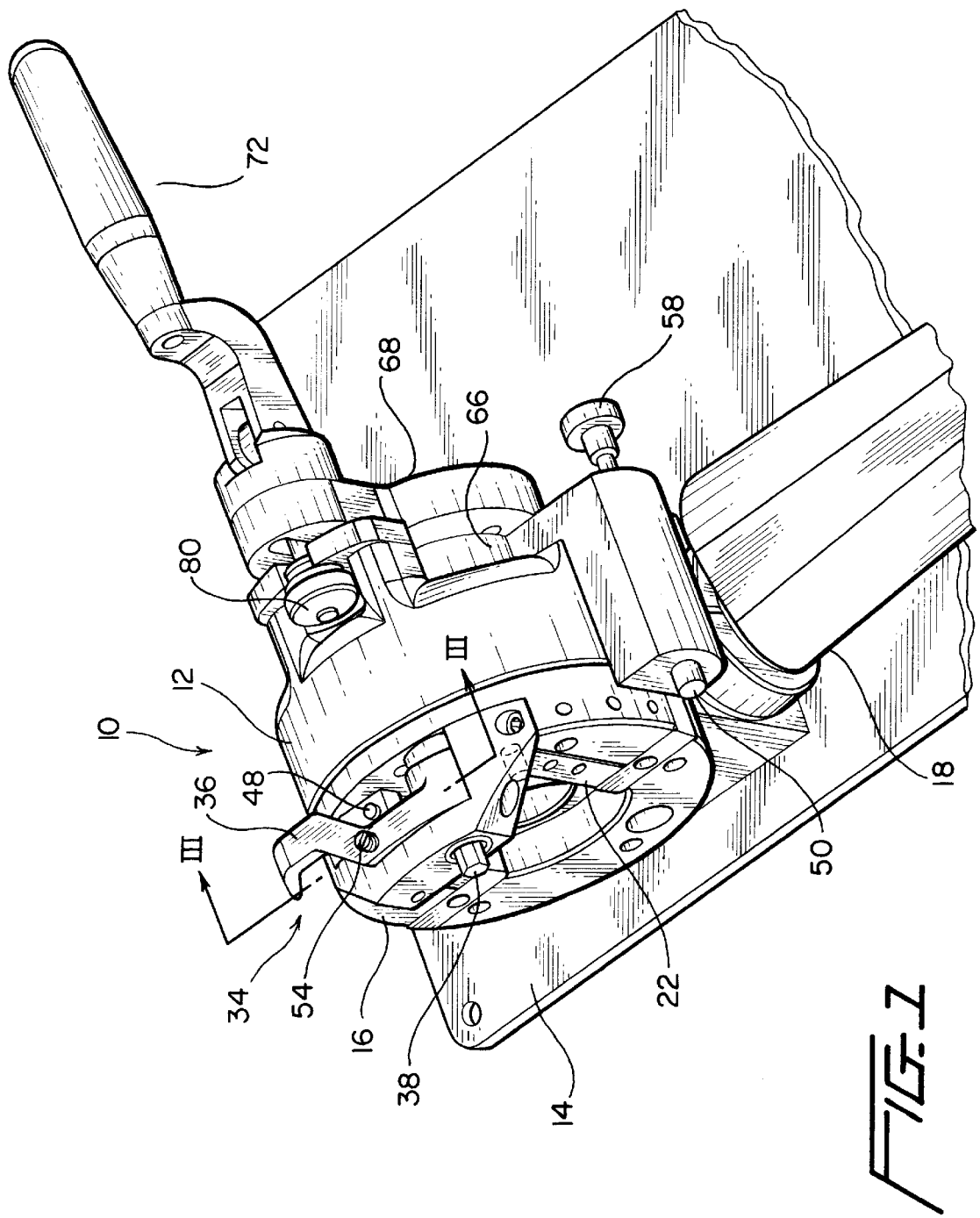
FIG. 1 is an isometric view of a preferred embodiment of a lathe-type machine tool using the cam actuated feed control invention described and claimed herein for controlling the feed of a part-off tool bit used to cut off or divide a tubular workpiece.

With reference to the accompanying drawings, FIG. 1 shows a portable lathe-type machine tool 10 arranged in the configuration as-illustrated to part-off or cut off lengths of tubular workpieces by feeding a part-off tool bit (to be described below) radially through the side wall of the tubular workpiece while the tool bit is driven circumferentially around the perimeter of the workpiece.

The tool 10 includes a relatively fixed housing 12 that may be mounted on a base 14 and which carries at its forward end a rotary head or headstock 16 driven in rotation relative to the housing about an axis of rotation Y (see FIG. 2) by drive motor 18. The drive motor 18, when energized, causes rotary motion of head 16 through suitable drive shafting and gearing that do not constitute a part of this invention but which are known to persons of ordinary skill in the art.

As shown in FIG. 2, rotary head 16 carries at its forward end a tool bit holder 20 by means of sliding gib elements 22,24 that each include V-groove edges 26,28 that cooperate with mating V-shaped edge portions of the tool bit holder 20. Accordingly, cutting tool bit holder 20 is slidable vertically or radially as illustrated in FIG. 2 towards and away from the axis of rotation Y of the rotary head 16 by means of the gibs 22,24.

The tool bit holder is arranged to secure a tool bit 30 in a conventional manner. Thus, rotation of rotary head 16 carries with it the tool bit holder 20 which in turn drives the tool bit 30 with the rotary head 16 in a circular motion relative to the rotary axis Y of the rotary head 16. Advancement of the tool bit holder 20 radially towards the axis of rotation Y is considered to be advancement of the tool bit 30 in a feed direction with respect to a workpiece held in fixed relationship to the housing 12 by a work holder to be described below. Compression springs 32 bias tool bit holder 20 towards a retracted position or in a direction away from rotational axis Y against a cam or a return stop to be described below.

Tool bit holder 20 and its associated tool bit 30 are advanced towards and away from the rotational axis Y for performing cutting operations on a workpiece held fixed relative to the rotational axis by means of a cam-actuated feed control generally indicated at 34. In this example, the tool bit 30 is a conventional part-off tool bit. The feed control includes a cam actuator arm or lever 36 pivotally mounted on stub shaft 38 that is connected to head 16 and extends along an imaginary axis lying parallel to the axis of rotation Y of rotary head 16. The shaft 38 may have a hexagonal distal end as illustrated to facilitate engagement by a socket wrench or the like for manually rotating the shaft 38 to enable set up of the tool.

Figure 4:
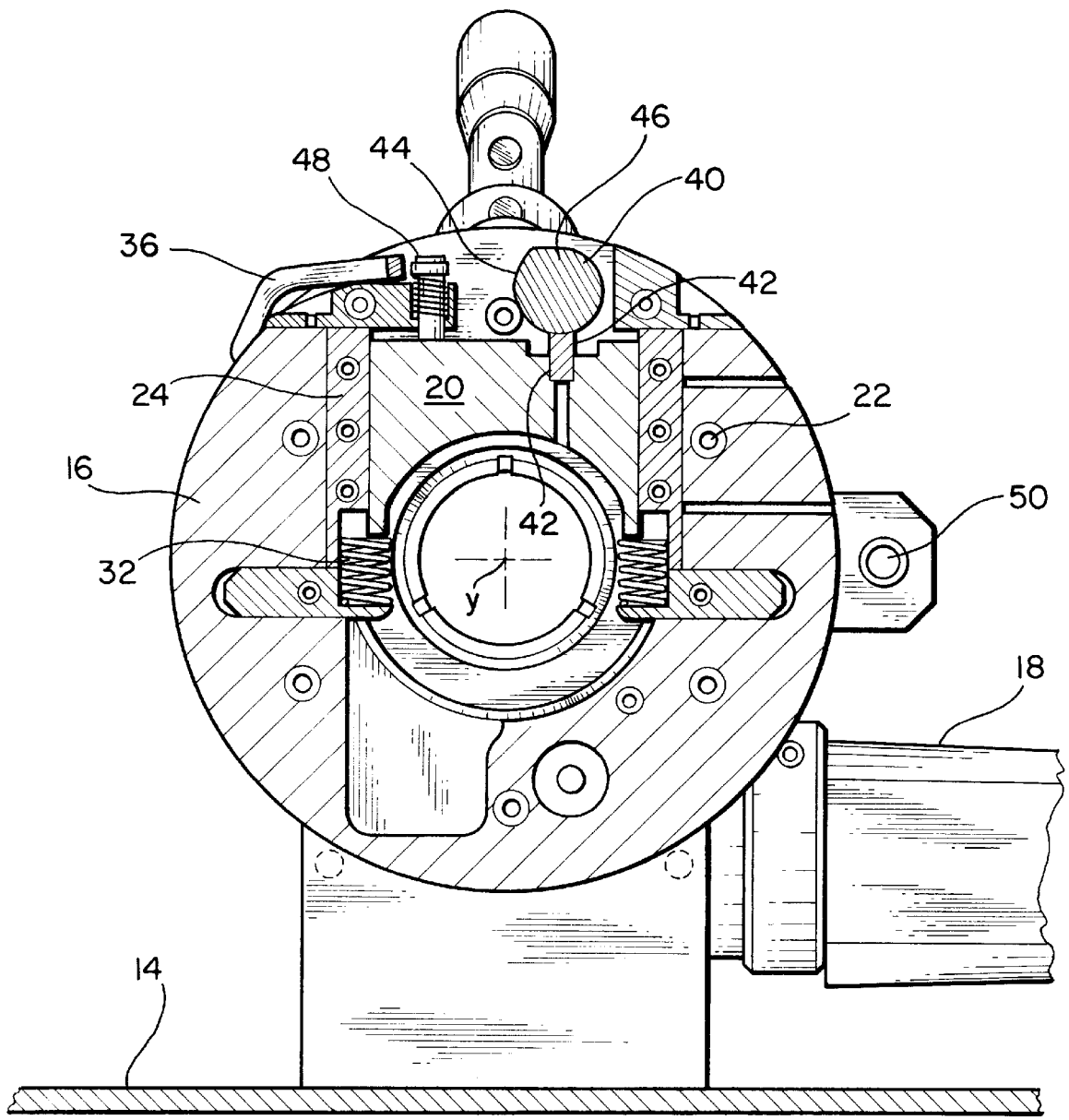
FIG. 4 is a section view taken along line IV—IV in FIG. 5.

Stub shaft 38 in accordance with the illustrated embodiment includes an integral cam lobe 40 having a shaped profile for uniform motion output as illustrated in FIG. 4. Tool bit holder 20 includes a cam follower 42 press-fitted or otherwise secured to the tool bit holder 20 and that is arranged to be engaged by the profile of the cam lobe 40 to cause displacement of tool bit holder 20 in a forward feed direction towards rotational axis Y upon rotation of the cam 40. It will be seen that the cam lobe 40 includes a uniform motion profile 44 and a flat or "non-lift" portion 46 whereby, upon rotation of the cam lobe 40 in a counterclockwise direction as viewed in FIG. 4 and upon relative motion of the follower 42 past the point of maximum lift of the lobe 44 when the follower engages meeting the non-lift portion 46, the springs 32 will quickly urge the tool bit holder 20 upwardly or away from the rotational axis Y back to a starting or retracted position. The springs 32, of course, maintain the follower 42 in firm engagement with the cam lobe 40. While cam 40 as illustrated is integral with shaft 38, it could be a separate cam element assembled to shaft 38 or the equivalent.

Return stop 48 as illustrated comprises a bolt or other abutment secured to the rotary head 16 and which is adjustable for example by rotation thereof to establish a stopping position for the tool bit holder 20 against the bias of springs 32. As illustrated in FIG. 4, cam lobe 40 has already displaced the tool bit holder 20 in a feed direction towards the rotational axis Y and away from the stop 48. However, upon the motion of the cam lobe 40 to the extent that the flat portion 46 aligns with the follower 42, the springs 32 will urge the tool bit holder 20 upwardly against the return stop 48, which essentially establishes the starting position of the tool bit holder 20 before its advancement in a forward or feed direction between tool operation cycles.

The stub shaft 38 and the associated cam lobe 40 are intermittently driven in a single rotational direction by means of cam actuator arm 36 that engages a striker 50 or equivalent preferably disposed at a fixed location on housing 12 once per revolution of rotary head 16 so as to cause oscillation of the arm about the axis of shaft 38. The striker 50 is located in the plane of rotation of arm 36, of course, to ensure that the arm will engage the striker and be deflected thereby so as to pivot about the axis of shaft 38.

The counterclockwise part of the oscillating pivotal movement of the arm 36 in a counterclockwise direction as viewed in FIGS. 2 and 4 is transmitted to stub shaft 38 and cam lobe 40 through a one-way roller or ball-type drive clutch 52. The clutch 52 is arranged concentrically with shaft 38 and arm 36 such that counterclockwise pivotal movement of arm 36 as viewed in FIGS. 2 and 4 caused by the distal end of arm 36 engaging striker 50 is transmitted to the shaft 38 through the clutch 52 due to the lock up action of the clutch. However, upon reverse clockwise pivotal motion of the arm 36, no motion is transmitted to the shaft 38 or the cam lobe 40 due to the free wheeling of the clutch in the opposite direction.

An appropriate spring or other biasing arrangement 39 urges arm 36 normally towards its upward or rest position as shown in FIG. 3 against a feed motion stop that is preferably in the form of an adjusting screw 54 that establishes a starting position for the arm 36 when arm 36 engages striker 50 each revolution of rotary head 16 about axis Y. Adjustment of the stop screw 54 varies the starting position of the arm 36 relative to the striker 50 and also effectively limits the stroke of arm 36 as it is deflected by engagement with striker 50 upon rotation of rotary head 16. Accordingly, the stop screw 54 adjusts the increment of travel of the tool bit holder 20 and its associated tool bit 30 each rotation of rotary head 16.

A second one-way drive roller or ball clutch 56 (FIG. 5) is oriented concentrically with shaft 38 and cooperates with the shaft and rotary head 16 such that rotation of the shaft 38 in a reverse direction relative to the rotary head 16 is prevented by locking up of the clutch 56 in the reverse rotation direction. It will thus be seen that one-way drive clutches 52 and 56 are arranged to transmit rotary motion in opposite directions while freewheeling (no motion transmitted) in the opposite directions. Intermittent pivotal motion of cam actuator arm 36 is thus transmitted as rotation to the shaft 38 in one direction while the shaft 38 is held against reverse rotation relative to the rotary head 16 when the cam actuator arm 36 is pivoting in a clockwise direction in the illustrated example towards its starting position during each periodic cycle of operation of the cam actuator arm 36. One-way clutches 52 and 56 used in the preferred embodiment are available from the Torrington Company as Model No. RC-081208, and are roller-type clutches mounted concentrically with shaft 38.

It is to be understood that the term "one-way clutch" encompasses any type of drive transmitting device that essentially couples together driving and driven elements when the driving element is moved in one direction and uncouples the driving and driven elements when the driving element motion is reversed.

The striker 50 may be retracted out of the plane of engagement with cam actuator arm 36 by means of a manipulating knob 58 when it is desired to rotate the rotary head 16 without any feed motion of the cam actuator arm 36. Various other adjustments can be made to striker 50 to adjust the feed rate of arm 36 or for other purposes known in the art.

Figure 5:
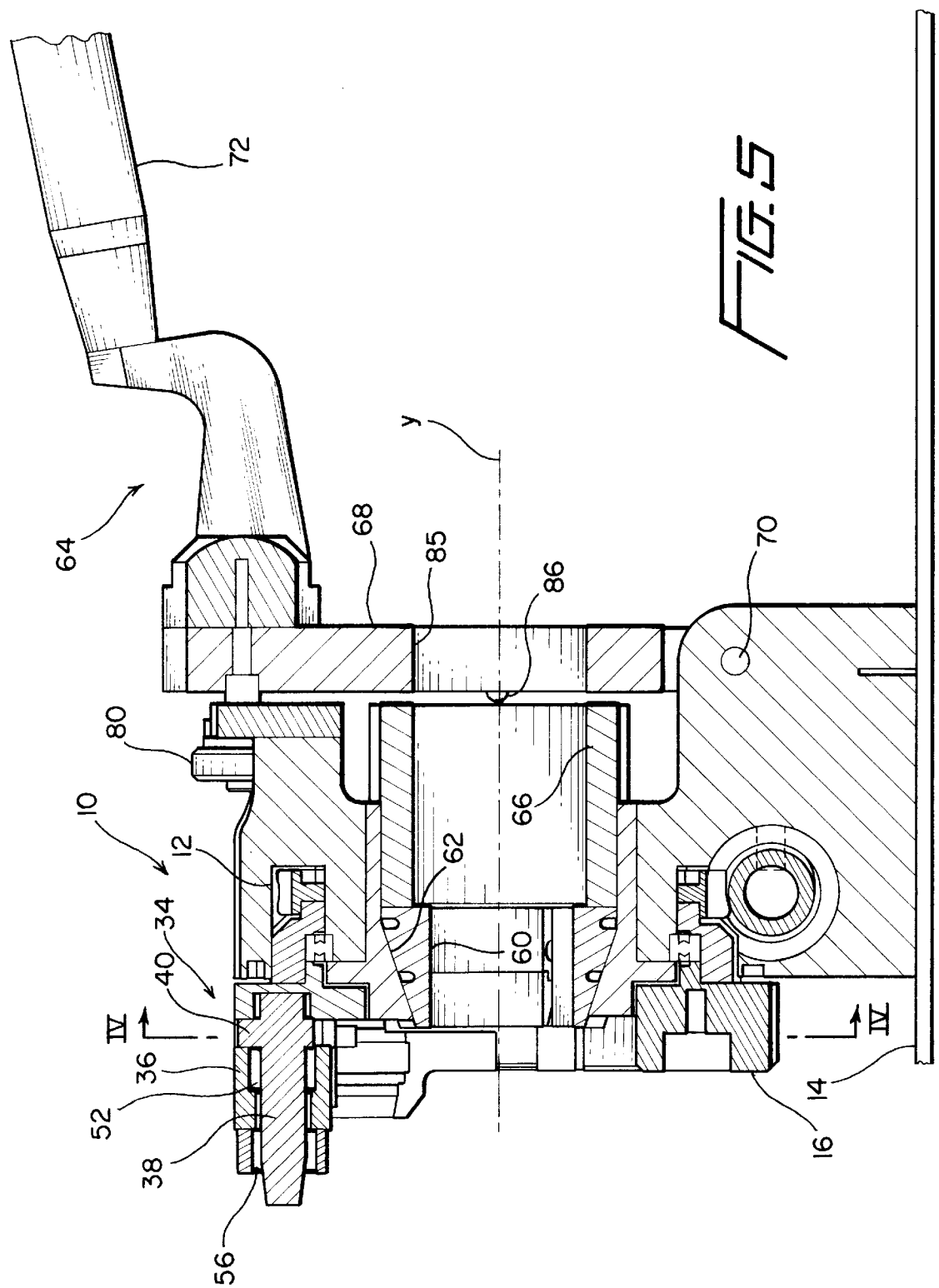
FIG. 5 is a section side view taken along line V—V in FIG. 2 and showing the workpiece holding chuck and its actuator in the locked position.

A holder for fixing a tubular workpiece (not shown) relative to the housing 12 is illustrated in FIGS. 5 and 6. While any suitable work holder can be utilized with the cam-actuated feed device 34, a preferred embodiment includes a multi-segmented chuck 60 concentrically arranged with respect to the axis of rotation Y and also arranged to engage the periphery of a tubular workpiece (not shown) positioned centrally within the chuck 60 upon inward camming of the chuck segments caused by displacement of the chuck 60 to the left as viewed in FIGS. 5 and 6. Such leftward motion causes the outer surfaces of the segments of the chuck 60 to engage a conical cam profile 62 to cause the segments 60 to contract inwardly and engage the periphery of the tubular workpiece to thus clamp the workpiece relative to the housing 12 relative to the rotational axis Y.

The chuck 60 is actuated by a lever and cam arrangement generally indicated at 64 and an axial thrust member 66 that extends between the chuck 60 and the lever/cam arrangement 64.

The lever/cam 64 includes a thrust plate 68 pivoted about a transverse pivot pin 70 and a lever or handle 72 having a cam 74 thereon cooperating with cam follower surface 76.

A latching rod 78 and an adjustable latch plate 80 mounted by helical threads or the like to rod 78 such that the distance between the latch plate 80 and the pivot point 82 of latching rod 78 is adjustable.

As will be evident from viewing FIGS. 5 and 6, with thrust member 66 in place adjacent the rear surfaces of chuck segments 60, the plate 80 is placed against a stop surface 84 on the housing 12 and the lever 72 is pivoted clockwise as viewed in FIGS. 5 and 6 to cause a tension to be exerted on the rod 78 by the reaction of the cam 74 against the cam follower 76 that is transmitted through the pivot point 82 into rod 78 to thereby cause the thrust plate 68 to be pivoted counterclockwise about its pivot pin 70 with a large mechanical advantage. Counterclockwise pivotal motion of the plate 68 is transmitted into the thrust member 66 which in turn is transmitted into the segments of chuck 60 to cause their motion in a leftward direction as viewed in FIGS. 5 and 6 to thereby cause contraction of the segments about the periphery of a workpiece disposed along the axis Y and extending through the chuck.

It will be noted that thrust plate 68 includes a central aperture 85 that accommodates a workpiece extending along the axis of rotation Y of the rotary head 16 and a pair of thrust pins 86 having rounded distal ends located on diametrically opposite sides of the aperture 85 and lying in a transverse plane that intersects rotational axis Y. The pins 86 thus serve to transmit thrust directly into the thrust member 66 from the thrust plate 68 without interference arising from the slight pivotal motion of the plate 68 about the transverse pivot 70.

Various size chucks can be substituted for the chuck 60 and various size thrust members 66 can be interposed between the thrust plate 68 and the chuck 60 to accommodate various size workpieces. The thrust member 66 is shown removed in FIG. 6, which also shows the release position of the lever 72 and the latch plate 80.

Operation of the cam-actuated feed control 34 is as follows. Following securing of a workpiece centrally in the housing 12 with the forward end area of the workpiece located adjacent the tool bit 30, the feed rate to be applied to the cam 40 resulting from actuator arm 36 engaging striker 50 is adjusted using the stop screw 54. The starting position of the tool bit holder 20 is also adjusted by setting the position of the return stop 48. The starting position of the cam is set up and then motor 18 is energized to rotate rotary head 16 to carry arm 36 cyclically and periodically past striker 50 to cause its intermittent pivotal motion in a counterclockwise direction as viewed in FIGS. 2, 3 and 4 to thereby cause intermittent unidirectional rotation of cam lobe 40. Rotation of cam lobe 40 in turn drives the tool bit holder 20 via follower 42 in a radial direction towards the rotational axis Y while the tool bit 30 is simultaneously carried in a circular path in the cutting plane of the tool about the periphery of the workpiece to thereby incrementally feed the tool bit 30 into the workpiece each pass that is made by the tool bit 30 around the axis Y. The arm 36 pivots back to its starting position under the influence of return spring 39. The pair of one-way drive clutches 52,56 ensure that the intermittent oscillating motion of the actuator arm 36 is transmitted in one direction to the shaft 38 and cam lobe 40 while the latter are prevented from reverse rotation upon the return of the actuator arm 36 to its starting position. Springs 32 maintain the follower 42 on tool bit holder 20 in engagement with the lobe 40. The springs 32, of course, also cause return of the tool bit holder 20 to its starting position when the cam lobe 40 is rotated to the extent that the flat section 46 lies opposite the follower 42. The return of the tool bit holder 20 to its starting position releases the tool bit from the cutting position and permits ready removal of the workpiece from the chuck 60. The lever/cam device 64 permits rapid engagement of the chuck 60.

It will be envisioned that various substitutions and modifications of the preferred embodiment illustrated in the drawings and described above can be made without departing from the invention as defined in the claims. It will be understood that persons skilled in the art will envision various substitutions of functionally equivalent structure for the structural elements described without departing from the invention.

What is claimed is:

1. A cam-actuated feed control for a machine tool including a relatively fixed housing, a rotary head carrying a radially movable tool bit holder attached to the housing and rotatable about a longitudinal axis of rotation to drive the tool bit holder in rotation about the axis in a cutting plane with said tool bit holder movable in feed directions towards and away from said axis, said housing including a workpiece holder for holding a workpiece fixed relative to the longitudinal axis of rotation of the rotary head, wherein the feed control comprises:

a cam actuator arm movably mounted on the rotary head for cyclic movement;

a rotationally mounted cam element carried by the rotary head and connected to said cam actuator arm through a one-way clutch device such that cyclic motion of the cam actuator arm in opposite directions is transmitted to the cam element as periodic unidirectional rotation through said one-way clutch device;

said cam element being associated with the tool bit holder such that the periodic unidirectional rotation of the cam element causes periodic motion of the tool bit holder in a tool feed direction toward the axis of rotation; and a tool bit holder biasing device arranged to resiliently urge the tool bit holder towards a retracted position away from the rotational axis and in driving relationship with the cam element.

2. A cam-actuated feed control as claimed in claim 1, said cam element comprising a cam lobe having a uniform motion lift profile;

said tool bit holder including a cam follower;

said cam lobe arranged to engage said cam follower and to cause displacement of the cam follower in a tool feed direction upon rotation of the cam element in a forward rotary feed direction.

3. A cam-actuated feed control as claimed in claim 2, said cam lobe profile including a non-lift section that cooperates with the cam follower such that the tool bit holder is rapidly returned to a retracted position by the tool bit holder biasing device upon the meeting of the non-lift section with the follower.

4. The cam actuated feed control as claimed in claim 1, 2 or 3, including a reverse rotation preventing device connected between the rotary head and the cam element, and arranged to prevent rotation of the cam element relative to the rotary head in a reverse direction.

5. The cam actuated feed control as claimed in claim 4, wherein said reverse rotation preventing device is a second one-way clutch device.

6. The cam actuated feed control as claimed in claim 1, 2 or 3, said cam actuator arm mounted on the rotary head for pivotal oscillating motion about a pivot axis; and including a striker element carried by the housing; and wherein said actuator arm is arranged to engage said striker element and to be moved from a starting position through a forward feed range of pivotal movement once per revolution of said rotary head upon rotation of the rotary head and the cam actuator arm relative to the housing; and including a return device associated with the cam actuator arm for returning the arm to a starting position each cycle of rotation of the rotary head.

7. A cam-actuated feed control as claimed in claim 6, including a feed motion limiting device associated with the cam actuator arm and arranged to limit the forward feed range of pivotal motion of the actuator arm upon its engagement with the striker element.

8. A cam-actuated feed control as claimed in claim 1, 2 or 3, including an adjustable return stop device associated with the tool bit holder and arranged to engage the tool bit holder to adjustably limit its return motion away from the rotary head rotational axis under the influence of the tool bit holder biasing device.

9. A cam-actuated feed control as claimed in claim 4, said cam actuator arm mounted on the rotary head for pivotal oscillating motion about a pivot axis; and including a striker element carried by the housing; and wherein said actuator arm is arranged to engage said striker element and to be moved from a starting position through a forward feed range of pivotal movement once per revolution of said rotary head upon rotation of the rotary head and the cam actuator arm relative to the housing; and including a return device associated with the cam actuator arm for returning the arm to a starting position each cycle of rotation of the rotary head; and further including a feed motion limiting device associated with the cam actuator arm and arranged to limit the forward feed range of pivotal motion of the actuator arm upon its engagement with the striker element; and an adjustable return stop device associated with the tool bit holder and arranged to engage the tool bit holder to adjustably limit its return motion away from the rotary head rotational axis under the influence of the tool bit holder biasing device.

10. A cam-actuated feed control as claimed in claim 6, wherein the pivot axis extends parallel to the longitudinal axis of rotation of the head.

11. A cam-actuated feed control as claimed in claim 9, wherein the pivot axis extends parallel to the longitudinal axis of rotation of the head.

* * * * *